E. L. McKINNEY.
RESILIENT WHEEL.
APPLICATION FILED AUG. 23, 1915.
1,224,399.
Patented May 1, 1917.
2 SHEETS—SHEET 1.
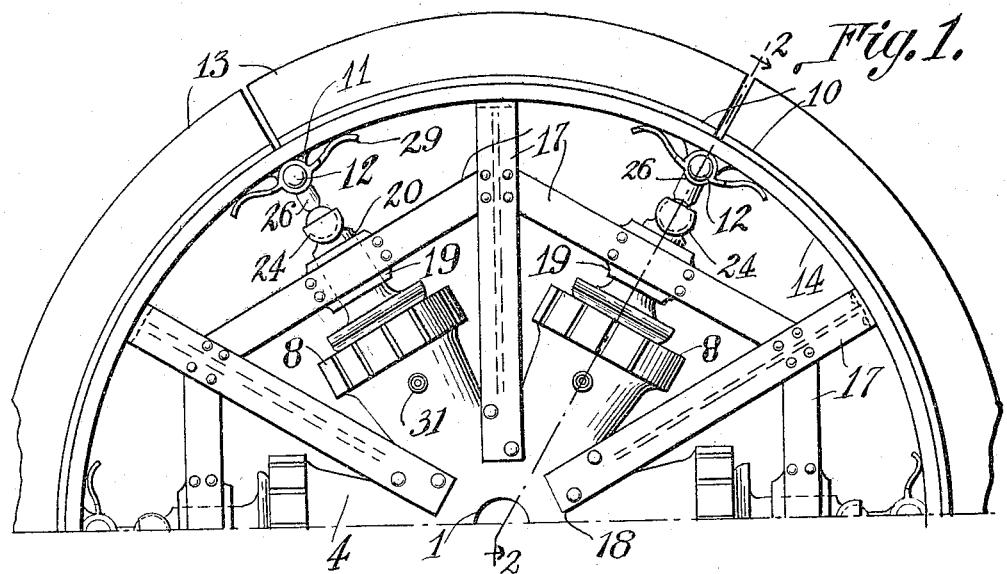
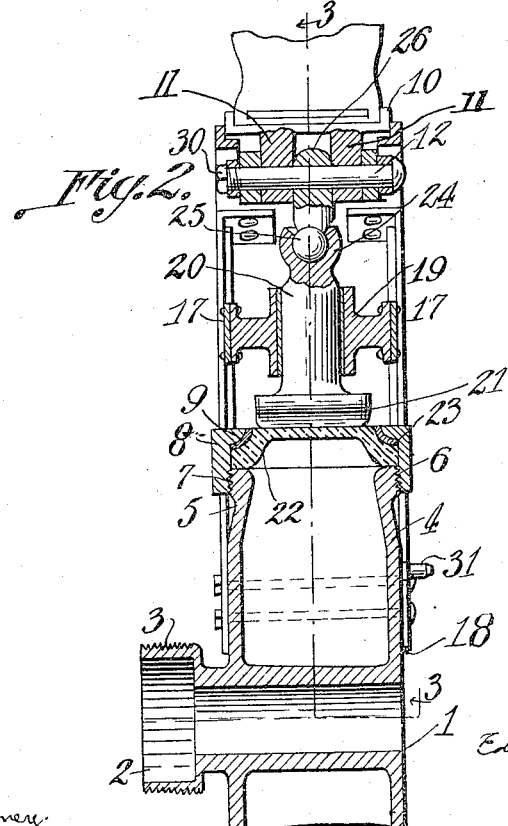
Witnesses
M. S. Mawhinney.
Wm V. Garvey
Inventor
Edward L. McKinney
By Bernard F. Garvey Jr.
Attorney E. L. McKINNEY.
RESILIENT WHEEL.
APPLICATION FILED AUG. 23, 1915.
1,224,399.
Patented May 1, 1917.
2 SHEETS—SHEET 2.
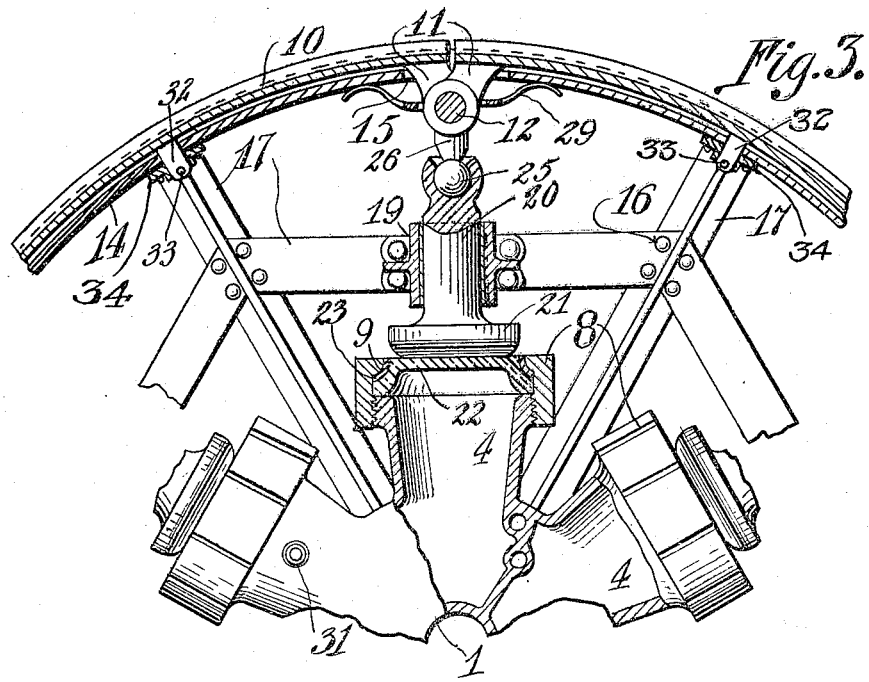
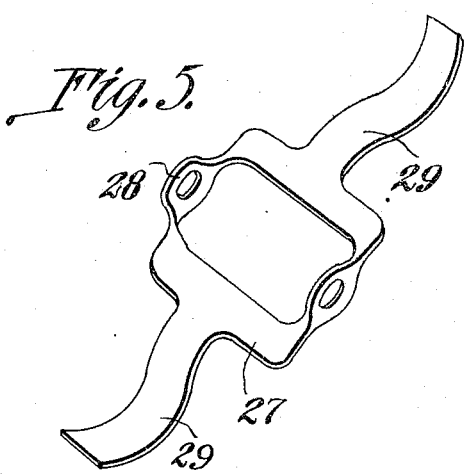
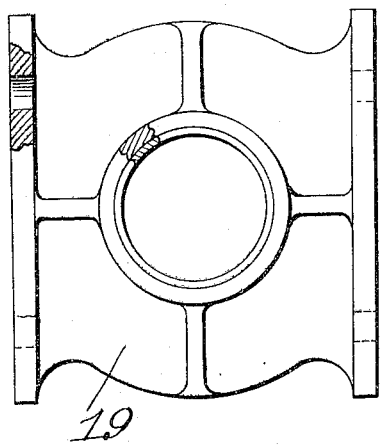
Witnesses
M. S. Mawhinney.
Wm V. Garvey.
Inventor
Edward L. McKinney
By Bernard F. Garvey Jr.
Attorney

UNITED STATES PATENT OFFICE.

EDWARD L. McKINNEY, OF JOHNSTOWN, PENNSYLVANIA.

RESILIENT WHEEL.

1,224,399.   Specification of Letters Patent.   Patented May 1, 1917.

Application filed August 23, 1915. Serial No. 46,933.

*To all whom it may concern:*

Be it known that I, EDWARD L. McKINNEY, a citizen of the United States, residing at Johnstown, in the county of Cambria and State of Pennsylvania, have invented certain new and useful Improvements in Resilient Wheels, of which the following is a specification.

This invention relates to vehicle wheels, and has especial reference to wheels embodying a resilient medium which will adequately absorb shock occasioned to the wheel on the road of travel.

An object of the invention is to so construct the wheel that a maximum degree of resiliency will be afforded, at the same time permitting an appreciable lateral movement of the wheel, thereby preserving the same from incapacitation by lateral thrust or undue movement in any other direction.

Another object of the invention is to utilize the pneumatic principle in order to attain the desired resiliency without subjecting the air container to contact with the road of travel, which has notoriously rendered the otherwise efficient pneumatic tire undesirable in view of its liability to puncture and consequent expense.

Other objects as well as the nature, characteristic features, and scope of the invention will be more readily understood from the following description taken in connection with the accompanying drawings and pointed out in the claims appended hereto.

Referring to the drawings—

Figure 1 is a side elevational view of a portion of a wheel constructed in accordance with my invention;

Fig. 2 is a detail enlarged sectional view taken on the line 2—2 of Fig. 1 and looking in the direction of the arrows, portions thereof being broken away to disclose details;

Fig. 3 is a detail enlarged fragmentary view of the wheel showing a sectional view taken on the line 3—3 of Fig. 2 and looking in the direction of the arrows;

Fig. 4 is a plan view of one of the bearings for the plunger used in this invention, a portion thereof being broken away, and Fig. 5 is an inverted perspective view of one of the equalizers used in this invention by which the component parts of the wheel are normally held in proper position.

Referring to the drawings by numerals, a hub 1 is provided which may be of the usual or any desired configuration, having one end 2 thereof enlarged and provided with external screw threads 3 as illustrated to advantage in Fig. 2. A plurality of radially arranged air chambers or cylinders 4 are integrally formed on the outer periphery of the hub 1, each of which tapers inwardly, as indicated at 5, adjacent its free end. The free terminals 6 of the chambers 4 are enlarged and provided with external screw threads 7 which are engaged with corresponding threads on a retaining ring 8. The outer marginal edge of each of the rings 8 is turned inwardly at right angles to the body to provide an annular flange, the inner face of which is preferably of an arcuate configuration as indicated at 9.

A metal felly 10 is provided which, in this instance, comprises a plurality of segmental sections the opposite terminals of each of which have ears 11 depending from their inner faces adapted for pivotal engagement with a bolt 12, as shown to advantage in Fig. 2. The felly in this instance is shown to be of the usual U-shape configuration in cross section, adapted for the reception of complemental solid tread members 13.

A reinforcing ring member 14 is concentrically mounted within the plane of the felly 10 and is provided with a plurality of openings 15 therein through which the ears 11 depend as shown to advantage in Fig. 3. Upon reference to this view it will be seen that the ring 14 is appreciably smaller than the felly 10 to permit sufficient movement of the latter on the former to absorb shock which will be occasioned to the tread 13.

A bracing structure generally designated 16 is carried by the inner periphery of the ring 14 and comprises a plurality of radially and circumferentially arranged metal straps 17 which are preferably associated in the manner best shown in Figs. 1 and 3. The inner ends of each of the radially arranged straps 17 are fixedly engaged, as at 18, with a web portion of the hub, between the air chamber 4. It will therefore be appreciated that the bracing structure 16, hub 1, and ring 14 are permanently associated and will remain intact when pressure is exerted on the tread 13.

The straps 17 are mounted in pairs and are spaced from each other to accommodate therebetween bearing members 19 each of the latter consisting of a cylindrical sleeve having arms formed on its periphery and extending at diametrically opposite points into engagement with the circumferentially arranged straps, midway the ends of the latter.

A radial support 20 is slidably mounted in each of the bearing sleeves 19, one end 21 of which is enlarged to provide a head for engagement with an elastic cap 22. The elastic caps 22 are preferably made of rubber and are under normal conditions of a substantially hemi-spherical configuration, the inner face of each being engaged with the outer enlarged terminal 6 of one of the chambers 4. The caps 22 are held from displacement by the locking ring 8. It will be noted that since the locking rings 8 are made of metal, direct contact of the same with the rubber caps 22 would prematurely render the same unsuitable for use. Consequently a wear take-up washer 23 is interposed between the arcuate face 9 of each of the locking rings and the rubber cap 22. The washer 23 may be made of leather or any other suitable analogous material. The outer end of each of the radial supports 20 is formed to provide a socket 24 in which a spherical end 25 of a link 26 is mounted for universal movement. The opposite ends of each of the links 26 is pivotally engaged with one of the bolts 12, thereby compressing the cap 22 when pressure is exerted on the tread 13. This peculiar formation will likewise permit lateral movement of the tread to an appreciable degree thereby precluding possibilities of any portion of the wheel being distorted by lateral thrust of the wheel during traction of the same.

Mounted upon each of the bolts 12, is an equalizer 27 which in this instance is shown to be a metallic resilient plate the main body of which is of a quadrangular contour, the opposite ends thereof being formed to provide alining apertured lugs 28. Curved fingers 29 are formed on the opposite sides of the main body 27 and are slidably engaged with the inner periphery of the reinforcing ring 14. An opening is formed in the main body 27 to permit the ears 11 of the felly 10 to extend therethrough. Each of the bolts 12 is held from movement by a locking nut 30.

A plurality of keepers 32 are formed on the inner periphery of the felly 10 and are movably arranged through corresponding openings in the reinforcing rim 14. The keepers hold the felly from circumferential movement on the reinforcing rim and also limit the expansive movement of felly by means of pins 33. Said pins 33 are transversely arranged through the keepers and serve as abutments for contact with plates 34 which are carried by the inner periphery of the rim 14 between the free outer terminals of the radial straps 17.

In operation, it is of course to be understood that each of the chambers 4 will be filled with air through a suitable valve 31, since it is desired that the chambers be entirely independent of one another, whereby if one of the chambers be rendered inoperative, for any reason, the remaining chambers will be unaffected thereby. Assuming that the chambers are all inflated the wheel will assume a position substantially as shown in the various views of the drawings so that as soon as pressure is exerted on the tread 13 at any point the radial support, or supports, in connection with the portion of the treads which is flexed, will be operated, thereby compressing the corresponding cap or caps 22. The resiliency caused by the air in the chambers 4, in conjunction with the equalizers 27 will reposition the wheel as soon as the pressure has been relieved from the tread.

From the above it will be noted that the cylinders or chambers contain air under pressure and are closed at their inner ends adjacent the hub, but are entirely open and free at their outer ends remote from the hub. Also, the resilient caps extend across the open ends of the cylinders to retain the air therein and to support the radial rods or supports which only bear upon these caps. The caps are distended, or are flexed outwardly from the cylinders, by the air in the latter. These caps fit between the open ends of the cylinders and the radial rods or supports, may be introduced and withdrawn without separating the parts of the wheel by a lateral movement of the caps, and the caps fit against the open ends of the cylinders and do not extend or fit into them, except possibly to a slight extent should abnormal pressure be placed on the radial supports.

The bracing structure, which is rigid with the hub, securely holds the tread structure from lateral displacement, and the slots in the bracing structure and the universal joints in the radial supports prevent any undue binding and permit free movement of the tread.

It is to be understood that various changes in the proportion, construction, and arrangement of the various parts of this invention, which come within the purview of the appended claims may be made without departing from the spirit and scope of the invention.

What I claim is—

1. In a resilient wheel, a hub, radial air chambers carried by the hub having open outer ends, elastic caps secured over the outer open ends of the air chambers and being normally distended, a bracing structure carried by the hub, a tread surrounding the hub, and radial supports guided by the bracing structure and having connection with the tread, said radial supports being movable independently of and bearing against the elastic caps to support the tread thereon.

2. In a resilient wheel, a hub, air cylinders radiating from the hub and being closed at their inner ends adjacent to the hub and being open at their outer ends remote from the hub, resilient caps fitting against the outer open ends of the cylinders, retaining rings detachably secured about the open outer ends of the cylinders and having inwardly extending flanges overhanging the marginal edges of the resilient caps and binding thereagainst to press and hold the same against the cylinders and close the outer open ends thereof, a tread structure surrounding the hub, and radial supports extending inwardly from the tread structure and having their inner ends abutting against the caps to resiliently support the tread structure.

3. In a resilient wheel, a hub, radiating air chambers surrounding the hub and being open at the outer ends remote from the hub, resilient caps covering the outer open ends of the air chambers, a tread structure surrounding the hub, a bracing structure mounted on the hub and engaging the tread structure to hold it against lateral displacement, said bracing structure having bearing sleeves in radial alinement with the air chambers, radial supports extending inwardly from the tread structure through the bearing sleeves and resting against said resilient caps to resiliently support the tread structure, and laterally and circumferentially movable connections in the radial supports outwardly of the bearing sleeves to prevent undue binding between the bracing and tread structures and to permit the free radial movement of the tread structure.

4. In a resilient wheel, a sectional felly, a hub, radial universal supports between the hub and the sectional felly, a reinforcing ring spaced inwardly and extending throughout the length of the felly, a bracing structure rigidly supporting said reinforcing ring upon the hub, a plurality of keepers projecting inwardly from the sections of said felly and extending through the reinforcing ring, bracing plates surrounding the keepers to serve as abutments therefor to hold the felly sections from lateral and circumferential displacement, and pins projecting through the inner ends of said keepers and through said bracing structure for anchoring said keepers to the ring.

In testimony whereof I affix my signature.

EDWARD L. McKINNEY.

Copies of this patent may be obtained for five cents each, by addressing the "Commissioner of Patents, Washington, D. C."